(12) United States Patent
Teraoka et al.

(10) Patent No.: US 9,834,054 B2
(45) Date of Patent: Dec. 5, 2017

(54) SHOCK ABSORBER

(71) Applicant: KYB Corporation, Tokyo (JP)

(72) Inventors: Takashi Teraoka, Gifu (JP); Kazutaka Inamitsu, Aichi (JP); Tatsuya Masamura, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/022,323

(22) PCT Filed: Sep. 18, 2014

(86) PCT No.: PCT/JP2014/074721
§ 371 (c)(1),
(2) Date: Mar. 16, 2016

(87) PCT Pub. No.: WO2015/041298
PCT Pub. Date: Mar. 26, 2015

(65) Prior Publication Data
US 2016/0288604 A1 Oct. 6, 2016

(30) Foreign Application Priority Data

Sep. 19, 2013 (JP) ................................. 2013-193977

(51) Int. Cl.
*F16F 9/512* (2006.01)
*B60G 13/08* (2006.01)
(Continued)

(52) U.S. Cl.
CPC .............. *B60G 13/08* (2013.01); *F16F 9/516* (2013.01); *F16F 9/5126* (2013.01);
(Continued)

(58) Field of Classification Search
CPC B60G 13/08; B60G 2202/24; B60G 2206/41; B60G 2800/162; F16F 9/061;
(Continued)

(56) References Cited

U.S. PATENT DOCUMENTS 4,765,446 A * 8/1988 Murata .................... F16F 9/468
188/282.4
5,129,488 A * 7/1992 Furuya ................... B60G 17/08
188/282.6
(Continued)

FOREIGN PATENT DOCUMENTS

JP 2000-190721 A 7/2000
JP 2008-215459 A 9/2008
(Continued)

*Primary Examiner* — Thomas Irvin
(74) *Attorney, Agent, or Firm* — Rabin & Berdo, P.C.

(57) ABSTRACT

A shock absorber includes; a free piston that partitions the compression chamber into an expansion-side compression chamber and a contraction-side compression chamber; an expansion-side flow passage that connects the expansion-side chamber with the expansion-side compression chamber; a contraction-side flow passage that connects the contraction-side chamber with the contraction-side compression chamber; an expansion-side bypass valve provided in the expansion-side flow passage to admit only a flow directed from the expansion-side chamber to the expansion-side compression chamber and generate resistance; a contraction-side bypass valve provided in parallel with the expansion-side bypass valve to admit only a flow directed from the expansion-side compression chamber to the expansion-side chamber and generate resistance; an expansion-side elastic stopper configured to stop the free piston at an expansion-side stroke end; and a contraction-side elastic stopper configured to stop the free piston at a contraction-side stroke end.

6 Claims, 4 Drawing Sheets

(51) Int. Cl.
*F16F 9/516* (2006.01)
*F16F 9/348* (2006.01)
*F16F 9/46* (2006.01)
*F16F 9/18* (2006.01)
*F16F 9/06* (2006.01)

(52) U.S. Cl.
CPC ...... *B60G 2202/24* (2013.01); *B60G 2206/41* (2013.01); *B60G 2800/162* (2013.01); *F16F 9/061* (2013.01); *F16F 9/18* (2013.01); *F16F 9/348* (2013.01); *F16F 9/468* (2013.01); *F16F 2228/066* (2013.01)

(58) Field of Classification Search
CPC .... F16F 9/18; F16F 9/348; F16F 9/468; F16F 9/5126; F16F 9/516; F16F 2228/006
USPC .. 188/282.1, 282.5, 282.6, 297, 317, 322.15
See application file for complete search history.

(56) References Cited

U.S. PATENT DOCUMENTS

| | | | | |
|---|---|---|---|---|
| 5,207,300 A | * | 5/1993 | Engel | B60G 17/08 188/266.2 |
| 5,248,014 A | * | 9/1993 | Ashiba | F16F 9/50 188/282.5 |
| 5,316,114 A | * | 5/1994 | Furuya | B60G 17/08 137/625.3 |
| 5,368,142 A | * | 11/1994 | Ashiba | F16F 9/468 188/266.3 |
| 5,386,892 A | * | 2/1995 | Ashiba | F16F 9/516 188/280 |
| 6,220,409 B1 | * | 4/2001 | Deferme | F16F 9/3228 188/282.1 |
| 6,561,326 B2 | * | 5/2003 | Gotz | F16F 9/5126 188/282.5 |
| 7,954,609 B2 | * | 6/2011 | Chikamatsu | F16F 9/3485 188/280 |
| 7,958,981 B2 | * | 6/2011 | Teraoka | F16F 9/5126 188/298 |
| 8,967,344 B2 | * | 3/2015 | Park | F16F 9/3405 188/280 |
| 8,978,845 B2 | * | 3/2015 | Kim | F16F 9/5126 188/275 |
| 9,080,634 B2 | * | 7/2015 | Nowaczyk | F16F 9/50 |
| 9,086,111 B2 | * | 7/2015 | Kim | F16F 9/34 |
| 9,150,077 B2 | * | 10/2015 | Roessle | F16F 9/348 |
| 9,169,891 B2 | * | 10/2015 | Teraoka | F16F 9/5126 |
| 9,222,539 B1 | * | 12/2015 | Nowaczyk | F16F 9/512 |
| 9,239,092 B2 | * | 1/2016 | Nowaczyk | F16F 9/50 |
| 9,261,160 B2 | * | 2/2016 | Lee | F16F 9/5126 |
| 9,435,394 B2 | * | 9/2016 | Teraoka | F16F 9/348 |
| 9,441,700 B2 | * | 9/2016 | Nowaczyk | F16F 9/512 |
| 9,500,255 B2 | * | 11/2016 | Nowaczyk | F16F 9/512 |
| 9,541,153 B2 | * | 1/2017 | Park | F16F 9/3405 |
| 2004/0149530 A1 | * | 8/2004 | Drees | F16F 9/5126 188/322.15 |
| 2005/0056506 A1 | * | 3/2005 | Deferme | F16F 9/5126 188/322.15 |
| 2007/0125610 A1 | | 6/2007 | Goetz et al. | |
| 2011/0056783 A1 | * | 3/2011 | Teraoka | F16F 9/5126 188/313 |
| 2012/0234639 A1 | * | 9/2012 | Teraoka | F16F 9/5126 188/280 |
| 2013/0140117 A1 | * | 6/2013 | Yu | F16F 9/3405 188/280 |
| 2015/0184716 A1 | * | 7/2015 | Teraoka | F16F 9/5126 188/297 |
| 2015/0210136 A1 | * | 7/2015 | Teraoka | F16F 9/3487 188/282.5 |
| 2016/0025181 A1 | * | 1/2016 | Nowaczyk | F16F 9/5126 188/315 |
| 2016/0195153 A1 | * | 7/2016 | Teraoka | F16F 9/49 188/284 |

FOREIGN PATENT DOCUMENTS

| | | |
|---|---|---|
| JP | 2010-174992 A | 8/2010 |
| JP | 2012-031900 A | 2/2012 |
| JP | 2013-053681 A | 3/2013 |

* cited by examiner

SHOCK ABSORBER

TECHNICAL FIELD

The present invention relates to a shock absorber.

BACKGROUND ART

In the prior art, such a type of the shock absorber is interposed between a chassis and an axle of a vehicle to suppress vibration. The shock absorber of the prior art includes, for example, a cylinder, a piston slidably inserted into the cylinder to partition the inside of the cylinder into an expansion-side chamber of the piston rod side and a contraction-side chamber of the piston side, a first flow passage that causes the expansion-side chamber provided in the piston and the contraction-side chamber to communicate with each other to generate a damping force, a second flow passage opened from the leading edge of the piston rod to the side portion to cause the expansion-side chamber and the contraction-side chamber to communicate with each other, a housing provided with a compression chamber connected to the middle of the second flow passage and provided in the leading edge of the piston rod, a free piston slidably inserted into the compression chamber to partition the compression chamber into an expansion-side compression chamber and a contraction-side compression chamber, and a coil spring that biases the free piston. That is, the expansion-side compression chamber communicates with the expansion-side chamber through the second flow passage, and the contraction-side compression chamber communicates with the contraction-side chamber through the second flow passage, likewise (for example, see JP 2008-215459 A).

In the shock absorber having such a structure, the compression chamber is partitioned by the free piston into the expansion-side compression chamber and the contraction-side compression chamber, and the expansion-side chamber and contraction-side chamber do not directly communicate with each other through the second flow passage. However, as the free piston moves, a volume ratio between the expansion-side compression chamber and the contraction-side compression chamber changes. Therefore, a liquid inside the compression chamber accesses the expansion-side chamber and the contraction-side chamber depending on a shift amount of the free piston. For this reason, apparently, the expansion-side chamber and the contraction-side chamber communicate with each other through the second flow passage. In addition, in such a type of the shock absorber, a ratio of the flow rate of the second flow passage against the flow rate of the first flow passage is insignificant for a low-frequency vibration input. Meanwhile, for a high-frequency vibration input, a ratio of the flow rate of the second flow passage against the flow rate of the first flow passage increases.

Therefore, such a type of the shock absorber can generate a strong damping force for a low-frequency vibration input and generate a weak damping force for a high-frequency vibration input by virtue of a damping force attenuation effect. As a result, it is possible to reliably generate a strong damping force when the input vibration frequency is low, for example, when a vehicle turns. In addition, when the input vibration frequency is high, for example, when a vehicle travels on an uneven road surface, it is possible to generate a weak damping force to improve a vehicle ride quality.

SUMMARY OF INVENTION

Meanwhile, in the shock absorber interposed between the chassis and the axle of a vehicle, a damping force generated during an expanding motion is set to be stronger than a damping force generated during a contracting motion in order to improve a vehicle ride quality.

Therefore, in such a type of the shock absorber, a pressure of the expansion-side chamber compressed during the expanding motion tends to increase over a pressure of the contraction-side chamber compressed during the contracting motion. In addition, the pressure of the expansion-side chamber propagates to the expansion-side compression chamber, and the pressure of the contraction-side chamber propagates to the contraction-side compression chamber. For this reason, if the shock absorber expands and contracts repeatedly in a high frequency, the pressure of the expansion-side compression chamber becomes higher than the pressure of the contraction-side compression chamber. As a result, the free piston is continuously deviated to the contraction-side compression chamber side.

If the displacement of the free piston is deviated in this manner, a stroke margin of the free piston toward the contraction-side compression chamber side is reduced. In this case, the free piston may abut on the housing so that the displacement toward the contraction-side compression chamber becomes impossible. In particular, in the shock absorber discussed in JP 2008-215459 A, a damping characteristic changes unexpectedly if the displacement is abruptly inhibited when the free piston reaches the stoke end. In order to avoid such a problem, the free piston is controlled in a hydraulic locking manner not to be easily displaced by providing a variable-area orifice in addition to a constant-area orifice and slowly reducing a flow passage area of the variable-area orifice when the stoke amount increases from a neutral position of the free piston while the contraction-side chamber and the contraction-side compression chamber communicate with each other through the variable-area orifice. For this reason, in such a type of the shock absorber, if the displacement of the free piston is deviated, the flow passage area of the variable-area orifice is reduced at all times. Therefore, the free piston makes displacement inevitably under an unaffordable state.

In view of the aforementioned problems, it is therefore an object of the present invention to provide a shock absorber capable of preventing a loss of the damping force attenuation effect even when a high frequency vibration is continuously input.

According to one aspect of the present invention, a shock absorber includes: a cylinder; a piston slidably inserted into the cylinder to partition the inside of the cylinder into an expansion-side chamber and a contraction-side chamber; a piston rod movably inserted into the cylinder and provided with one end connected to the piston; a damping passage that connects the expansion-side chamber with the contraction-side chamber; a compression chamber; a free piston movably inserted into the compression chamber to partition the compression chamber into an expansion-side compression chamber and a contraction-side compression chamber; a spring member configured to generate a biasing force for suppressing displacement of the free piston with respect to the compression chamber; an expansion-side flow passage that connects the expansion-side chamber with the expansion-side compression chamber; a contraction-side flow passage that connects the contraction-side chamber with the contraction-side compression chamber; an expansion-side bypass valve arranged closer to the expansion-side chamber side relatively to the piston and provided in the expansion-side flow passage, the expansion-side bypass valve being configured to admit only a flow directed from the expansion-side chamber to the expansion-side compression chamber and generate resistance; a contraction-side bypass valve arranged closer to the expansion-side chamber side relatively to the piston and provided in the expansion-side flow passage in parallel with the expansion-side bypass valve, the contraction-side bypass valve being configured to admit only a flow directed from the expansion-side compression chamber to the expansion-side chamber and generate resistance; an expansion-side elastic stopper configured to stop the free piston at an expansion-side stroke end; and a contraction-side elastic stopper configured to stop the free piston at a contraction-side stroke end.

The foregoing and additional features and characteristics of the present invention will become more apparent from the following detailed description considered with the reference to the accompanying drawings.

DESCRIPTION OF EMBODIMENTS

A description will now be made for a shock absorber D according to an embodiment of the present invention with reference to the accompanying drawings.

Figure 1:
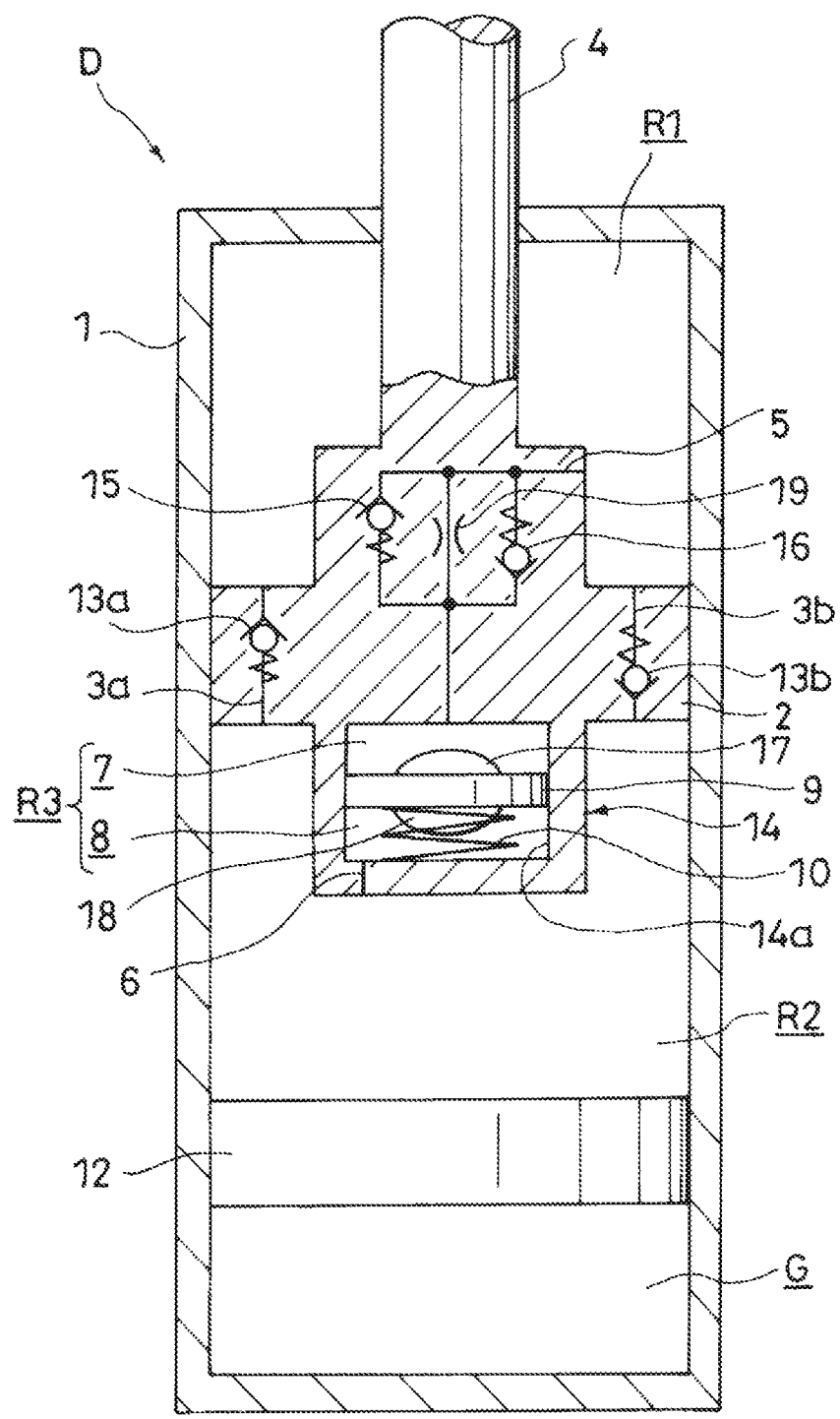
FIG. 1 is a vertical cross-sectional view conceptually illustrating an exemplary shock absorber according to an embodiment of the present invention.

Referring to FIG. 1, the shock absorber D includes a cylinder 1, a piston 2 slidably inserted into the cylinder 1 to partition the inside of the cylinder 1 into an expansion-side chamber R1 and a contraction-side chamber R2, a piston rod 4 movably inserted into the cylinder 1 and provided with one end connected to the piston 2, an expansion-side damping passage 3a and a contraction-side damping passage 3b as damping passages for connecting the expansion-side chamber R1 with the contraction-side chamber R2, a compression chamber R3, a free piston 9 movably inserted into the compression chamber R3 to partition the compression chamber R3 into an expansion-side compression chamber 7 and a contraction-side compression chamber 8, a spring member 10 that generates a biasing force for suppressing displacement of the free piston 9 with respect to the compression chamber R3, an expansion-side flow passage 5 that connects the expansion-side chamber R1 with the expansion-side compression chamber 7, a contraction-side flow passage 6 that connects the contraction-side chamber R2 with the contraction-side compression chamber 8, an expansion-side bypass valve 15 arranged closer to the expansion-side chamber R1 side relatively to the piston 2 and provided in the expansion-side flow passage 5 to admit only a flow directed from the expansion-side chamber R1 to the expansion-side compression chamber 7 and generate resistance, a contraction-side bypass valve 16 arranged closer to the expansion-side chamber side relatively to the piston 2 and provided in the expansion-side flow passage 5 in parallel with the expansion-side bypass valve 15 to admit only a flow directed from the expansion-side compression chamber 7 to the expansion-side chamber R1 and generate resistance, an expansion-side elastic stopper 17 that stops the free piston 9 at an expansion-side stroke end, and a contraction-side elastic stopper 18 that stops the free piston 9 at a contraction-side stroke end. The shock absorber D is interposed between a chassis and an axle of a vehicle to generate a damping force and suppress vibration of the chassis. It is noted that the expansion-side chamber R1 is a chamber compressed when the chassis and the axle recede from each other, and the shock absorber D expands. The contraction-side chamber R2 is a chamber compressed when the chassis and the axle approach each other, and the shock absorber D contracts.

The expansion-side chamber R1, the contraction-side chamber R2, and the compression chamber R3 are filled with a liquid such as a hydraulic fluid. In addition, referring to the lower half of FIG. 1, the cylinder 1 is internally provided with a slidable partitioning wall 12 that makes sliding contact with an inner circumference of the cylinder 1 to partition the inside of the cylinder 1 into the contraction-side chamber R2 and a gas chamber G.

It is noted that the liquid filled in the expansion-side chamber R1, the contraction-side chamber R2, and the compression chamber R3 may include, for example, water or an aqueous solution other than the hydraulic fluid.

The piston 2 is connected to one end of the piston rod 4 movably inserted into the cylinder 1. The piston rod 4 protrudes outward from the upper end of the cylinder 1 in the drawing. It is noted that a seal (not shown) is provided between the piston rod 4 and the cylinder 1 to maintain the inside of the cylinder 1 in a liquid tight state.

In FIG. 1, the shock absorber D is a so-called single rod type. For this reason, a volume of the piston rod 4 accessing the inside of the cylinder 1 in response to expansion/contraction of the shock absorber D is compensated by a vertical movement of the slidable partitioning wall 12 in FIG. 1 as a volume of the gas inside the gas chamber G expands or contracts. In this manner, the shock absorber D is provided with the slidable partitioning wall 12 and the gas chamber G inside the cylinder 1. Alternatively, instead of the slidable partitioning wall 12 and the gas chamber G, a reservoir may be provided in the outer circumference or the outside of the cylinder 1 so that the volume of the piston rod 4 is compensated by the reservoir. In addition, the shock absorber D may be a dual rod type instead of the single rod type.

Damping force generating members 13a and 13b such as an orifice or a leaf valve are provided in the middle of the expansion-side damping passage 3a and the contraction-side damping passage 3b, respectively. The damping force generating members 13a and 13b are configured such that resistance is generated to the flow of the liquid flowing through the expansion-side damping passage 3a and the contraction-side damping passage 3b. Specifically, although not illustrated in the drawings, the damping force generating member 13a sets the expansion-side damping passage 3a as a one-way passage that admits only a flow of the liquid directed from the expansion-side chamber R1 to the contraction-side chamber R2. In addition, the damping force generating member 13b sets the contraction-side damping passage 3b as a one-way passage that admits only a flow of the liquid directed from the contraction-side chamber R2 to the expansion-side chamber R1. As a result, assuming that a damping force is generated only by the expansion-side damping passage 3a and the contraction-side damping passage 3b during expansion or contraction of the shock absorber D, the liquid passes through only the expansion-side damping passage 3a during the expanding motion, and the liquid passes through only the contraction-side damping passage 3b during the contracting motion.

The resistance generated by the damping force generating member 13a to the flow of the liquid passing through the expansion-side damping passage 3a is higher than the resistance generated by the damping force generating member 13b to the flow of the liquid passing through the contraction-side damping passage 3b. Therefore, assuming that the piston speed is equal, the damping force during the expanding motion is higher than the damping force during the contracting motion.

It is noted that the damping force generating members 13a and 13b may be arranged, for example, in parallel with an orifice and a leaf valve well known in the art. Alternatively, for example, the damping force generating members 13a and 13b may be arranged in parallel with a chalk and a leaf valve or may also have a different configuration naturally. In addition, since the damping passage can be formed just by connecting the expansion-side chamber R1 with the contraction-side chamber R2, the expansion-side damping passage 3a and the contraction-side damping passage 3b may be provided in a part other than the piston 2. For example, the expansion-side damping passage 3a and the contraction-side damping passage 3b may be provided in the piston rod 4 or the outside of the cylinder 1.

In this embodiment, the compression chamber R3 is connected to a surface of the piston 2 opposite to the surface where the piston rod 4 is provided, and has a cavity portion 14a provided inside the housing 14 to face the contraction-side chamber R2. The free piston 9 making sliding contact with the side wall of the cavity portion 14a and vertically movable inside the cavity portion 14a in FIG. 1 divides the cavity portion 14a into the expansion-side compression chamber 7 illustrated in the upper half of FIG. 1 and the contraction-side compression chamber 8 illustrated in the lower half of FIG. 1. That is, the free piston 9 is slidably inserted into the housing 14 so as to be vertically displaceable in FIG. 1 with respect to the housing 14.

The spring member 10 is housed in the contraction-side compression chamber 8. The spring member 10 has one end connected to a lower end portion of the cavity portion 14a forming the compression chamber R3 and the other end connected to the free piston 9.

As the free piston 9 is displaced from a predetermined position inside the housing 14 (hereinafter, simply referred to as a "free-piston neutral position"), a biasing force proportional to its displacement is exerted from the spring member 10. The free-piston neutral position is a position of the free piston 9 determined by the spring member 10 with respect to the compression chamber R3. The free-piston neutral position may not be set to a center point of the vertical direction of the cavity portion 14a.

The spring member 10 may be housed in the expansion-side compression chamber 7. In addition, the spring member 10 may be a pair of springs housed in the expansion-side compression chamber 7 and the contraction-side compression chamber 8, and the free piston 9 may be interposed between the spring members so that it can be positioned in the neutral position.

It is noted that the inside of the housing 14 is vertically partitioned by the free piston 9 into the expansion-side compression chamber 7 and the contraction-side compression chamber 8 so that a vibration direction suppressed by expansion/contraction of the shock absorber D matches a movement direction of the free piston 9. For this reason, a vertical vibration of the entire shock absorber D in FIG. 1 may generate a vertical vibration of the free piston 9 with respect to the housing 14. In order to avoid such a phenomenon, the movement direction of the free piston 9 may be set to be perpendicular to the expansion/contraction direction of the shock absorber D, that is, a horizontal direction in FIG. 1, so that the expansion-side compression chamber 7 and the contraction-side compression chamber 8 are arranged in a horizontal direction in FIG. 1.

The housing 14 is provided with the contraction-side flow passage 6 that connects the contraction-side chamber R2 with the contraction-side compression chamber 8. It is noted that a throttle may be provided in the contraction-side flow passage 6 to generate resistance to the flow of the liquid passing therethrough. It is noted that the throttle may be obtained by employing various structures such as a constant-area orifice or a chalk.

The expansion-side chamber R1 is connected with the expansion-side compression chamber 7 through the expansion-side flow passage 5 that is opened from the side portion facing the expansion-side chamber R1 of the piston rod 4 and passes through the piston 2 and the housing 14.

In this manner, the expansion-side chamber R1 is connected with the expansion-side compression chamber 7 through the expansion-side flow passage 5, and the contraction-side chamber R2 is connected with the contraction-side compression chamber 8 through the contraction-side flow passage 6. The volumes of the expansion-side compression chamber 7 and the contraction-side compression chamber 8 change as the free piston 9 is displaced inside the housing 14.

In the shock absorber D, a flow passage including the expansion-side flow passage 5, the expansion-side compression chamber 7, the contraction-side compression chamber 8, and the contraction-side flow passage 6 connects the expansion-side chamber R1 with the contraction-side chamber R2, apparently. The expansion-side chamber R1 is also connected with the contraction-side chamber R2 through the apparent flow passage described above in addition to the expansion-side damping passage 3a and the contraction-side damping passage 3b.

In the side closer to the expansion-side chamber R1 than the piston 2 in the middle of the expansion-side flow passage 5, an expansion-side bypass valve 15 that admits only a flow directed from the expansion-side chamber R1 to the expansion-side compression chamber 7 and generates resistance and a contraction-side bypass valve 16 that admits only a flow directed from the expansion-side compression chamber 7 to the expansion-side chamber R1 and generates resistance are provided in parallel with each other.

The expansion-side bypass valve 15 and the contraction-side bypass valve 16 are operated to open or close, for example, the expansion-side flow passage 5 by using a valve body such as a leaf valve or a poppet valve, generate resistance to the flow of the liquid, and also serve as a check valve. In this manner, when the flow rate increases, a valve capable of generating smaller resistance to the flow of the liquid is employed, compared to a throttle such as an orifice or a chalk, is used.

The expansion-side bypass valve 15 and the contraction-side bypass valve 16 having an annular shape may be formed from a single leaf valve (de Carbon valve) of a so-called double swing type, in which the flow passage is opened by flexing an outer circumference side for a flow from one side, and the flow passage is opened by flexing the inner circumference side for a flow from the other side. Specifically, for example, if the inner circumference of the leaf valve is supported by the expansion-side compression chamber side, and the outer circumference is supported by the expansion-side chamber side, the outer circumference of the leaf valve is flexed to the expansion-side compression chamber side to admit the flow with resistance when the liquid flows from the expansion-side chamber R1 to the expansion-side compression chamber 7 through the expansion-side flow passage 5. Meanwhile, when the liquid flows from the expansion-side compression chamber 7 to the expansion-side chamber R1 through the expansion-side flow passage 5, the inner circumference is flexed to the expansion-side chamber side to admit the flow with resistance. In comparison, if the inner circumference of the leaf valve is supported by the expansion-side chamber side, and the outer circumference is supported by the expansion-side compression chamber side, the inner circumference may be flexed to the expansion-side compression chamber side to admit the corresponding flow with resistance when the liquid flows from the expansion-side chamber R1 to the expansion-side compression chamber 7 through the expansion-side flow passage 5. Meanwhile, when the liquid flows from the expansion-side compression chamber 7 to the expansion-side chamber R1 through the expansion-side flow passage 5, the outer circumference may be flexed to the expansion-side chamber side to admit the corresponding flow with resistance.

It is noted that, in FIG. 1, in the middle of the expansion-side flow passage 5, a throttle 19 is provided in parallel with the expansion-side bypass valve 15 and the contraction-side bypass valve 16. The throttle 19 enables movement of the free piston 9 by adjusting the pressure difference between the expansion-side chamber R1 and the expansion-side compression chamber 7 and makes it possible to recover the free piston 9 to the neutral position by virtue of a repulsive force of the spring member 10 even when the pressure difference between the expansion-side chamber R1 and the expansion-side compression chamber 7 is small, and an expansion/contraction rate of the shock absorber D is low, where the expansion-side bypass valve 15 and the contraction-side bypass valve 16 are not opened. If a check valve capable of admitting only the flow of the liquid directed from the expansion-side compression chamber 7 to the expansion-side chamber R1 is provided in a passage of the throttle 19, the contraction-side compression chamber 8 does not further receive a contracting force while the shock absorber D expands or contracts in a low expansion/contraction rate area even when the free piston 9 stops in a deviated position where the contraction-side compression chamber 8 is compressed rather than the neutral position. Therefore, it is possible to more facilitate returning of the free piston 9 to the neutral position. It is noted that the throttle 19 may be removed as necessary. If the throttle 19 is removed, the passage for the throttle 19 becomes also unnecessary. Therefore, the check valve provided in relation to the throttle 19 is removed naturally.

In the shock absorber D, an expansion-side elastic stopper 17 is provided on a surface of the expansion-side compression chamber 7 side of the free piston 9. In addition, a contraction-side elastic stopper 18 is provided on a surface of the contraction-side compression chamber 8 side of the free piston 9.

If the free piston 9 moves to contract the expansion-side compression chamber 7, and is displaced to the vicinity of the expansion-side stroke end where the expansion-side compression chamber 7 fully contracts, the expansion-side elastic stopper 17 abuts on the upper end of cavity portion 14a of the housing 14 in FIG. 1. The expansion-side elastic stopper 17 generates a repulsive force for suppressing movement of the free piston 9 toward the expansion-side stroke end. As the compression is further performed by the free piston 9 after the expansion-side elastic stopper 17 abuts on the housing 14, the repulsive force slowly increases so that movement of the free piston 9 is suppressed. The expansion-side elastic stopper 17 stops the free piston 9 as the free piston 9 reaches the expansion-side stroke end.

Similarly, in the case of the contraction-side elastic stopper 18, as the free piston 9 moves to contract the contraction-side compression chamber 8, and is displaced to the vicinity of the contraction-side stroke end where the contraction-side compression chamber 8 fully contracts, the contraction-side elastic stopper 18 abuts on the lower end of the cavity portion 14a of the housing 14 in FIG. 1. The contraction-side elastic stopper 18 generates a repulsive force for suppressing movement of the free piston 9 toward the contraction-side stroke end. As contraction is further performed by the free piston 9 after the contraction-side elastic stopper 18 abuts on the housing 14, the repulsive force slowly increases so that movement of the free piston 9 is suppressed. The contraction-side elastic stopper 18 stops the free piston 9 as the free piston 9 reaches the contraction-side stroke end.

It is noted that the expansion-side elastic stopper 17 and the contraction-side elastic stopper 18 may be formed of an elastic material such as rubber or resin and may have any shape. In addition, the expansion-side elastic stopper 17 and the contraction-side elastic stopper 18 may include a spring capable of generating a repulsive force, such as a coil spring, a plate spring, a disc spring, and a waved washer. Furthermore, the expansion-side elastic stopper 17 and the contraction-side elastic stopper 18 may be arranged inside housing 14 or may be installed in the housing 14 side such that they make contact with the free piston 9 as the free piston 9 is displaced to the vicinity of the stroke end.

The expansion-side elastic stopper 17 and the contraction-side elastic stopper 18 are provided such that they fully receive the force of the free piston 9 generated by the pressure. However, the expansion-side elastic stopper 17 and the contraction-side elastic stopper 18 may be configured such that the free piston 9 abuts on the housing 14 at the stroke end to stop there when the free piston 9 receives an abnormally high pressure. Even in this case, it is possible to slowly reduce the movement speed of the free piston 9 toward the stroke end before it reaches the stroke end by using the expansion-side elastic stopper 17 and the contraction-side elastic stopper 18. As a result, the free piston 9 slowly stops at the stroke end.

Next, a description will be made for basic operations of the shock absorber D.

In the expanding motion of the shock absorber D, in which the piston 2 moves upward in FIG. 1 with respect to the cylinder 1, the expansion-side chamber R1 contracts, and the contraction-side chamber R2 expands by the piston 2. As a result, the pressure of the expansion-side chamber R1 increases, and the pressure of the contraction-side chamber R2 decreases, so that a pressure difference is generated therebetween. Therefore, the liquid in the expansion-side chamber R1 moves to the contraction-side chamber R2 through the expansion-side damping passage 3a. In addition, the expansion-side bypass valve 15 is opened, so that the liquid moves to the contraction-side chamber R2 through an apparent flow passage including the expansion-side flow passage 5, the expansion-side compression chamber 7, the contraction-side compression chamber 8, and the contraction-side flow passage 6.

In comparison, in the contracting motion of the shock absorber D, in which the piston 2 moves downward in FIG. 1 with respect to the cylinder 1, the contraction-side chamber R2 contracts, and the expansion-side chamber R1 expands by the piston 2. As a result, the pressure of the contraction-side chamber R2 increases, and the pressure of the expansion-side chamber R1 decreases, so that a pressure difference is generated therebetween. Therefore, the liquid in the contraction-side chamber R2 moves to the expansion-side chamber R1 through the contraction-side damping passage 3b. In addition, the contraction-side bypass valve 16 is opened, so that the liquid moves to the expansion-side chamber R1 through the apparent flow passage including the expansion-side flow passage 5, the expansion-side compression chamber 7, the contraction-side compression chamber 8, and the contraction-side flow passage 6.

If the piston speed of the shock absorber D is equal, an amplitude of the shock absorber D for the low frequency input is larger than an amplitude of the shock absorber D for the high frequency input even when a vibration frequency input to the shock absorber D, that is, an expansion/contraction vibration frequency of the shock absorber D is either a high frequency or a low frequency.

For a low-frequency vibration input to the shock absorber D, since the low-frequency vibration has a high amplitude, a flow rate of the liquid accessing the expansion-side chamber R1 and the contraction-side chamber R2 for a single expansion/contraction cycle increases. In proportion to this flow rate, the displacement of the free piston 9 also increases. Since the free piston 9 is biased by the spring member 10, a biasing force of the free piston 9 received from the spring member 10 increases as the displacement of the free piston 9 increases. As a result, a pressure difference is generated between the expansion-side compression chamber 7 and the contraction-side compression chamber 8. Therefore, the pressure difference between the expansion-side chamber R1 and the expansion-side compression chamber 7 and the pressure difference between the contraction-side chamber R2 and the contraction-side compression chamber 8 are reduced, so that the flow rate passing through the apparent flow passage described above is reduced. As the flow rate passing through this apparent flow passage is reduced, the flow rate passing through the expansion-side damping passage 3a or the contraction-side damping passage 3b increases accordingly. Therefore, the damping force generated by the shock absorber D is maintained at a high value.

In comparison, for a high-frequency vibration input to the shock absorber D, since the high-frequency vibration has an amplitude smaller than that of the low-frequency vibration input, a flow rate of the liquid accessing the expansion-side chamber R1 and the contraction-side chamber R2 for a single expansion/contraction cycle decreases. Therefore, the displacement of the free piston 9 is also reduced. As the displacement of the free piston 9 is reduced, a biasing force of the free piston 9 received from the spring member 10 is also reduced. As a result, a nearly equal pressure is generated between the expansion-side compression chamber 7 and the contraction-side compression chamber 8. Therefore, the pressure difference between the expansion-side chamber R1 and the expansion-side compression chamber 7 and the pressure difference between the contraction-side chamber R2 and the contraction-side compression chamber 8 increase relatively to the low-frequency vibration input, so that the flow rate passing through the apparent flow passage described above increases relatively to that of the low-frequency vibration input. As the flow rate passing through the apparent flow passage increases, the flow rate passing through the expansion-side damping passage 3a or the contraction-side damping passage 3b is reduced accordingly. Therefore, the damping force generated by the shock absorber D is reduced relatively to the damping force of the low-frequency vibration input.

Figure 2:
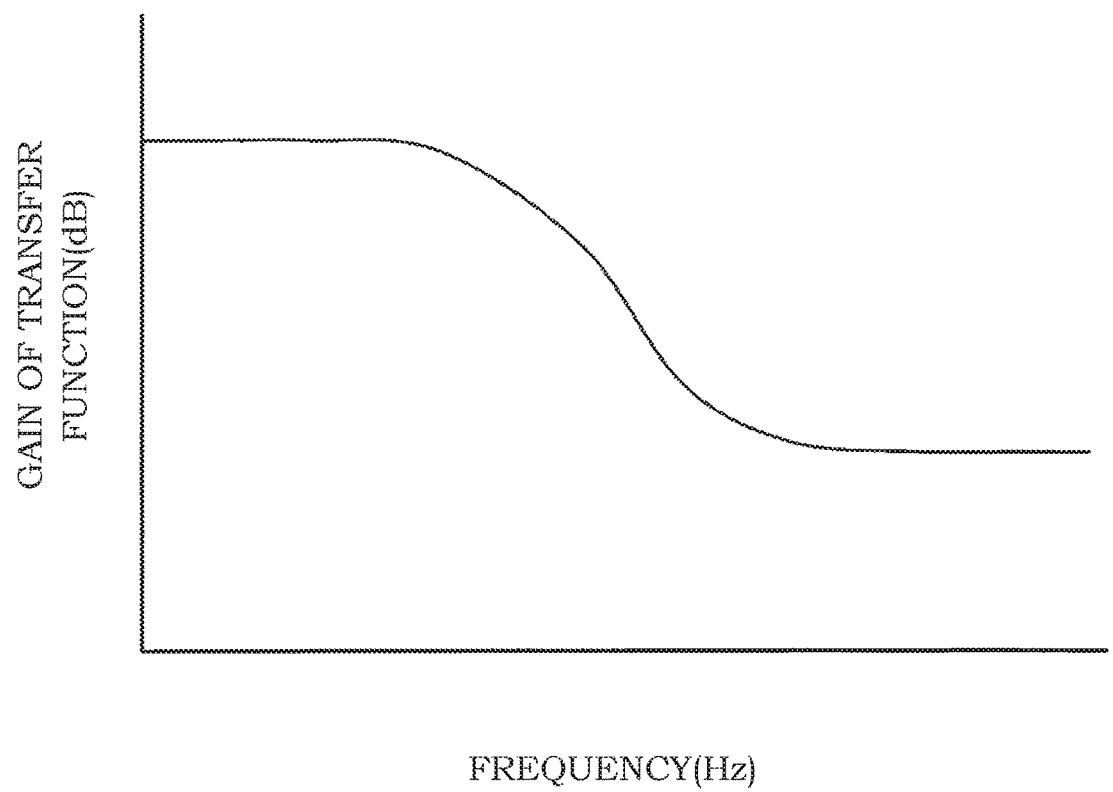
FIG. 2 is a bode diagram illustrating a gain characteristic of a transfer function of a frequency against a flow rate.

When the piston speed is low, a gain characteristic against the frequency of the frequency transfer function between the flow rate and the pressure difference is high for the low-frequency vibration and is low for the high-frequency vibration as illustrated in FIG. 2.

Figure 3:
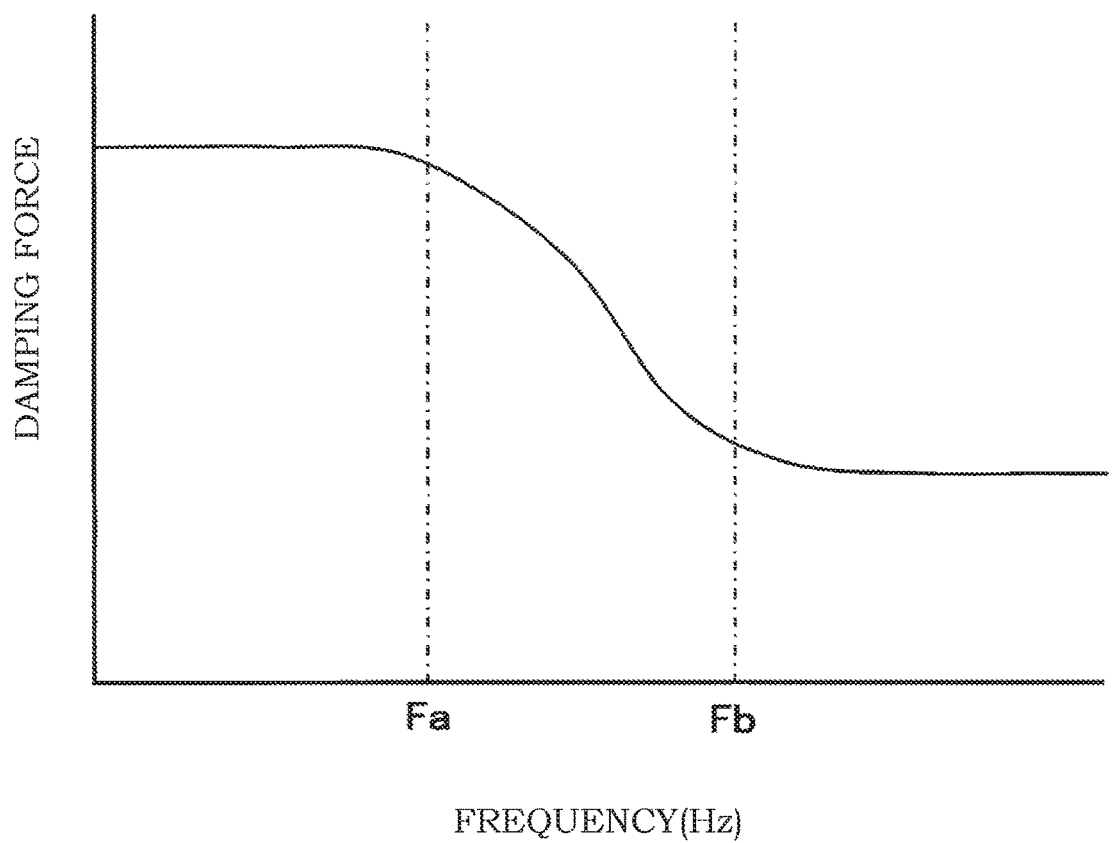
FIG. 3 is a diagram illustrating a damping characteristic of the shock absorber against a vibration frequency.

Referring to FIG. 3 which shows a characteristic of the damping force of the shock absorber D, indicating a gain of the damping force against the vibration frequency input, a strong damping force is generated for the low-frequency vibration, and a weak damping force is generated for the high-frequency vibration. In this manner, it is possible to cause a change of the damping force of the shock absorber D to depend upon the input vibration frequency.

In the damping characteristic of FIG. 3, a lower inflection point frequency Fa is set to be equal to or higher than a sprung-mass resonance frequency of a vehicle and be equal to or lower than a unsprung-mass resonance frequency of the vehicle, and an upper inflection point frequency Fb is set to be equal to or lower than the unsprung-mass resonance frequency of the vehicle. As a result, the shock absorber D can generate a strong damping force for a vibration input having the sprung-mass resonance frequency. Therefore, it is possible to stabilize a posture of the vehicle and prevent an uncomfortable feeling of a passenger when the vehicle turns. In addition, since a weak damping force is generated for the vibration input of the unsprung-mass resonance frequency at all times, a vibration of the axle side is not transmitted to the chassis side. Therefore, it is possible to provide an excellent ride quality of the vehicle.

When the flow rate is large, the expansion-side bypass valve 15 and the contraction-side bypass valve 16 is less subject to a pressure loss relatively to an orifice or a variable-area orifice employed in shock absorbers of the prior art. For this reason, even when a high-frequency vibration is continuously input to the shock absorber D, and the free piston 9 is deviated from the neutral position to the expansion-side compression chamber 7 side or the contraction-side compression chamber 8 side, a liquid pressure lock that suppresses movement of the free piston 9 is not generated. Therefore, the free piston 9 can smoothly move, and it is possible to sufficiently exhibit the damping force attenuation effect.

When the free piston 9 reaches the stroke end, the expansion-side elastic stopper 17 or the contraction-side elastic stopper 18 decelerates and stops movement of the free piston 9. Therefore, without using a liquid pressure lock unlike the shock absorbers of the prior art, it is possible to slowly decelerate and stop the free piston 9 at the stroke end. As a result, it is possible to prevent an abrupt loss of the damping force attenuation effect and an abrupt change of the damping force caused by an abrupt stop of the free piston 9.

Even when the expansion/contraction rate of the shock absorber D is high, and a large amount of the liquid flows through the expansion-side bypass valve 15 and the contraction-side bypass valve 16, a pressure loss in the expansion-side bypass valve 15 and the contraction-side bypass valve 16 is insignificant relatively to an orifice or a variable-area orifice. For this reason, it is avoided that a pressure is not easily transmitted to the inside of the compression chamber R3 from the expansion-side chamber R1 or the contraction-side chamber R2 and the free piston 9 has an immovable state while the free piston 9 can move inside the housing 14. Therefore, even when the expansion/contraction rate of the shock absorber D increases, the damping force attenuation effect is not lost.

In this manner, it is possible to slowly decelerate and stop the free piston 9 at the stroke end by using the expansion-side elastic stopper 17 or the contraction-side elastic stopper 18 of the shock absorber D. In addition, since the expansion-side bypass valve 15 and the contraction-side bypass valve 16 less subject to a pressure loss even under a high flow rate are employed instead of the throttle such as an orifice serving as a liquid pressure lock, movement of the free piston 9 is not locked until the stroke end even when the free piston 9 is deviated from the neutral position.

Therefore, using the shock absorber D according to this embodiment, it is possible to exhibit a damping force attenuation effect even when a high-frequency vibration is continuously input, and the free piston 9 is deviated toward the contraction-side compression chamber side.

Therefore, in the shock absorber D according to this embodiment, it is possible to exhibit a damping force attenuation effect even when a high-frequency vibration is continuously input. As a result, it is possible to implement an excellent ride quality even when a vehicle travels on an uneven or bumpy road.

The expansion-side bypass valve 15 and the contraction-side bypass valve 16 are arranged closer to the expansion-side chamber side than to the piston 2. For this reason, when the expansion-side bypass valve 15 and the contraction-side bypass valve 16 are obtained by employing a leaf valve, it is possible to increase a seat diameter seated on a valve seat (maximum radius from the center to the portion abutting on the valve seat). In addition, it is possible to improve a degree of freedom for setting resistance generated in the flow of the liquid passing through the expansion-side bypass valve 15 and the contraction-side bypass valve 16. That is, as the diameters of the expansion-side bypass valve 15 and the contraction-side bypass valve 16 increase, flexural rigidity is reduced. Therefore, it is possible to lower a lower limit of the resistance generated in the flow of the liquid. Accordingly, it is possible to improve a degree of freedom for setting the resistance.

In this shock absorber D, for a high-frequency vibration input, the expansion-side bypass valve 15 generates resistance to the liquid directed from the expansion-side chamber R1 to the expansion-side compression chamber 7, and the contraction-side bypass valve 16 generates resistance to the liquid directed from the expansion-side compression chamber 7 to the expansion-side chamber R1. Therefore, by setting the resistance of the expansion-side bypass valve 15 generated in the flow of the liquid and the resistance of the contraction-side bypass valve 16 generated in the flow of the liquid, it is possible to tune, individually for expansion and contraction, the frequency where the damping force attenuation effect starts to work effectively. For example, it is possible to equally balance between the pressures applied to the upper and lower surfaces of the free piston 9 in FIG. 1 between expansion and contracting motions of the shock absorber D. As a result, by repeating expansion and contraction of the shock absorber D, it is possible to suppress a deviation of the free piston 9 from the neutral position of the free piston 9 to the contracting direction of the expansion-side compression chamber 7 or to the contracting direction of the contraction-side compression chamber 8. In addition, when the expansion/contraction rate is high, the damping force attenuation effect is not lost.

While the structure of the shock absorber D has been described conceptually hereinbefore, a description will now be made of an exemplary shock absorber D1 obtained by more specifically embodying the structure.

Figure 4:
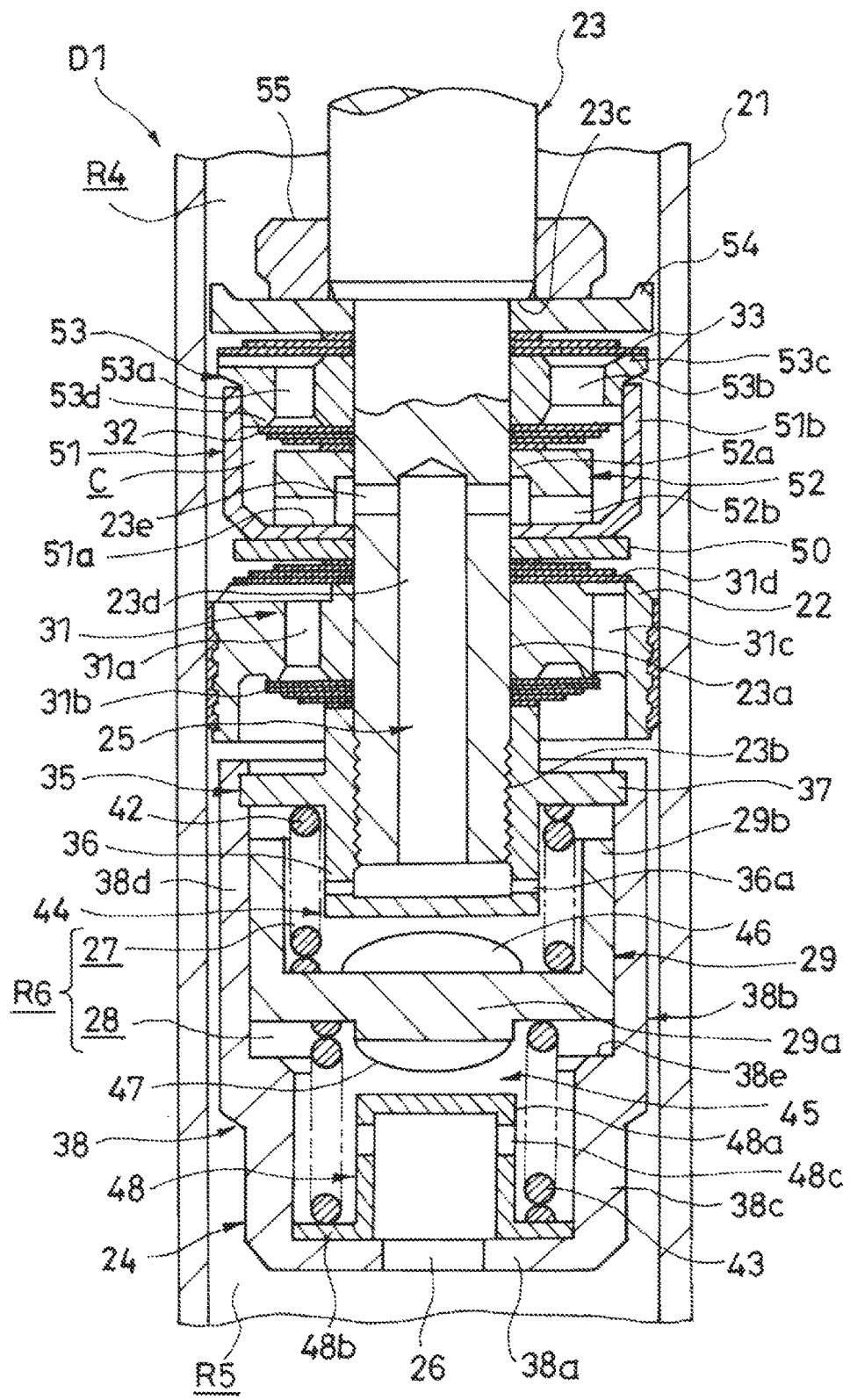
FIG. 4 is a vertical cross-sectional view illustrating a specific example of the shock absorber according to an embodiment of the present invention.

Referring to FIG. 4, the shock absorber D1 includes a cylinder 21, a piston 22 slidably inserted into the cylinder 21 to partition the inside of the cylinder 21 into a pair of operational chambers, that is, an expansion-side chamber R4 and a contraction-side chamber R5, a piston rod 23 having one end connected to the piston 22, a damping passage 31 that connects the expansion-side chamber R4 with the contraction-side chamber R5, a housing 24 fixed to a leading edge of the piston rod 23 and internally provided with a compression chamber R6, a free piston 29 movably inserted into the housing 24 to partition the compression chamber R6 into the expansion-side compression chamber 27 and the contraction-side compression chamber 28, coil springs 42 and 43 serving as a spring member that generates a basing force for suppressing displacement of the free piston 29 with respect to the housing 24, an expansion-side flow passage 25 that connects the expansion-side chamber R4 with the expansion-side compression chamber 27, a contraction-side flow passage 26 that connects the contraction-side chamber R5 with the contraction-side compression chamber 28, an expansion-side bypass valve 32 provided in the expansion-side flow passage 25 to admit only a flow directed from the expansion-side chamber R4 to the expansion-side compression chamber 27, a contraction-side bypass valve 33 also provided in the expansion-side flow passage 25 to admit only a flow directed from the expansion-side compression chamber 27 to the expansion-side chamber R4, an expansion-side elastic stopper 44 that stops the free piston 29 at an expansion-side stroke end, and a contraction-side elastic stopper 45 that stops the free piston 29 at a contraction-side stroke end. It is noted that, although not illustrated in the drawings, similar to the shock absorber D of FIG. 1, a slidable partitioning wall and a gas chamber are provided under the cylinder 21.

A description will now be made for each part in more detail.

The piston rod 23 has a small diameter portion 23a in a lower end side in FIG. 4, and a thread portion 23b is formed in a leading edge side of the small diameter portion 23a. In addition, since a lower end of the piston rod 23 has a small diameter, a step portion 23c is provided. The piston 22 is formed in an annular shape, and the small diameter portion 23a of the piston rod 23 is inserted into the inner circumference side of the piston 22.

The piston rod 23 is provided with a vertical hole 23d opened from the leading edge of the small diameter portion 23a and a horizontal hole 23e opened from the side portion of the small diameter portion 23a over a position, where the piston 22 is mounted, and connected to the vertical hole 23d.

The piston 22 is provided with an expansion-side port 31a and a contraction-side port 31c that connect the expansion-side chamber R4 with the contraction-side chamber R5. The lower end of the expansion-side port 31a in FIG. 4 is opened or closed by the expansion-side valve 31b formed by a leaf valve stacked on the lower side of the piston 22 in FIG. 4. Similarly, the upper end of the contraction-side port 31c in FIG. 4 is opened or closed by the contraction-side valve 31d formed by a leaf valve stacked on the upper side of the piston 22 in FIG. 4.

Both the expansion-side valve 31b and the contraction-side valve 31d are formed in an annular shape, and the small diameter portion 23a of the piston rod 23 is inserted into the inner circumference side. In addition, the expansion-side valve 31b and the contraction-side valve 31d are stacked on the piston 22 such that the inner circumference sides thereof are fixed to the piston rod 23, and the outer circumference sides thereof can be flexed. It is noted that the number of stacked plates or the thicknesses of the leaf valves included in the expansion-side valve 31b and the contraction-side valve 31d may change arbitrarily depending on a desired damping characteristic. In addition, the expansion-side valve 31*b* and the contraction-side valve 31*d* may also be formed by a valve other than the leaf valve. The leaf valve includes thin annular plates. When the leaf valve is assembled to the piston rod 23, the lengths of the plates are reduced along the axial direction. Therefore, since the expansion-side valve 31*b* and the contraction-side valve 31*d* are formed as the leaf valve, a stroke length of the shock absorber D1 can be easily obtained.

The expansion-side valve 31*b* is flexed and opened by the pressure difference between the expansion-side chamber R4 and the contraction-side chamber R5 during the expanding motion of the shock absorber D1, so that the expansion-side port 31*a* is opened, and resistance is generated in the flow of the fluid moving from the expansion-side chamber R4 to the contraction-side chamber R5. It is noted that the expansion-side valve 31*b* is operated to close the expansion-side port 31*a* during the contracting motion of the shock absorber D1, so that the expansion-side port 31*a* is set as a one-way passage.

Conversely to the expansion-side valve 31*b*, the contraction-side valve 31*d* is operated to open the contraction-side port 31*c* during the contracting motion of the shock absorber D1 to generate resistance to the flow of the fluid moving from the contraction-side chamber R5 to the expansion-side chamber R4. It is noted that the contraction-side valve 31*d* is operated to close the contraction-side port 31*c* during the expanding motion of the shock absorber D1, so that the contraction-side port 31*c* is set as a one-way passage. That is, the expansion-side valve 31*b* is a damping force generating member that generates an expansion-side damping force during the expanding motion of the shock absorber D1, and the contraction-side valve 31*d* is a damping force generating member that generates a contraction-side damping force during the contracting motion of the shock absorber D1. Therefore, according to this embodiment, the damping passage 31 includes the expansion-side port 31*a*, the expansion-side valve 31*b*, the contraction-side port 31*c*, and the contraction-side valve 31*d*.

The expansion-side valve 31*b* connects the expansion-side chamber R4 with the contraction-side chamber R5 through an orifice well known in the art (not shown) even when the expansion-side port 31*a* is closed. The orifice is formed, for example, by providing a notch on the outer circumference of the expansion-side valve 31*b* or by providing a concave portion on the valve seat (not shown) formed in the piston 22 for seating the expansion-side valve 31*b*. Similarly, the contraction-side valve 31*d* has an orifice such as a notch. It is noted that, assuming that the piston speed of the shock absorber D1 is equal, resistance generated by the expansion-side valve 31*b* to the flow of the liquid is set to be larger than that of the contraction-side valve 31*d*.

An annular valve stopper 50 is stacked on the piston 22 in the upside in FIG. 4 in the expansion-side chamber R4 side corresponding to the upside of the contraction-side valve 31*d* of FIG. 4 and is mounted to the outer circumference of the small diameter portion 23*a* of the piston rod 23.

A bottomed-cylindrical cap 51, a tubular spacer 52 housed in the cap 51 and stacked on the bottom portion 51*a* of the cap 51, an expansion-side bypass valve 32 as an annular leaf valve, a bypass valve disc 53, a contraction-side bypass valve 33 as an annular leaf valve, and a dead-end stopper 54 for restricting full expansion of the shock absorber D1 are sequentially assembled to the small diameter portion 23*a* of the piston rod 23 over the valve stopper 50 in FIG. 4. It is noted that an annular dead-end cushion 55 is stacked on the dead-end stopper 54 in the upside in FIG. 4. The dead-end cushion 55 abuts on a rod guide (now shown) at the time of full expansion of the shock absorber D1 to alleviate a dead-end impact.

The expansion-side valve 31*b* is stacked beneath the piston 22 in FIG. 4. The expansion-side valve 31*b* is mounted to the outer circumference of the small diameter portion 23*a* of the piston rod 23 along with the piston 22. The housing 24 is screwed to a thread portion 23*b* of the piston rod 23 from the lower side of the expansion-side valve 31*b* in FIG. 4 to form the compression chamber R6. Each of the aforementioned elements mounted to the outer circumference of the piston rod 23 is interposed between the step portion 23*c* of the piston rod 23 and the housing 24 and is fixed to the piston rod 23. In this manner, the housing 24 internally forms the compression chamber R6 and serves as a piston nut for fixing the aforementioned valves to the piston rod 23.

The cap 51 arranged in the expansion-side chamber R4 side over the piston 22 in FIG. 4 has a bottomed-cylindrical shape as described above and is provided with a bottom portion 51*a* and a tubular portion 51*b*. The bottom portion 51*a* is provided with a hole (not shown) for enabling insertion of the piston rod 23.

The spacer 52 has a tubular shape and has an inner diameter larger than the outer diameter of the small diameter portion 23*a* of the piston rod 23. The spacer 52 has an inner circumferential flange 52*a* fitted to the outer circumference of the piston rod 23 provided in the upper-end inner circumference and a notch 52*b* provided in the lower end. In addition, the spacer 52 is stacked on the bottom portion 51*a* of the cap 51 and is assembled to the small diameter portion 23*a* of the piston rod 23. As a result, the spacer 52 faces the horizontal hole 23*e* of the piston rod 23, and an internal space of the spacer 52 is connected with the vertical hole 23*d* through the horizontal hole 23*e*.

The bypass valve disc 53 has a hole (not shown) where the piston rod 23 is inserted. The bypass valve disc 53 has a contraction-side bypass port 53*b* and an expansion-side bypass port 53*a* connected with the expansion-side chamber R4, a valve seat 53*d* provided in the lower end of the bypass valve disc 53 in FIG. 4 to surround the expansion-side bypass port 53*a*, and a valve seat 53*c* provided in the upper end of the bypass valve disc 53 in FIG. 4 to surround the contraction-side bypass port 53*b*. The outer circumference of the bypass valve disc 53 is fitted to the inner circumference of the cap 51. In this manner, since the bypass valve disc 53 is fitted to the cap 51, a chamber C partitioned from the expansion-side chamber R4 is formed inside the cap 51.

The chamber C is connected with the horizontal hole 23*e* and the vertical hole 23*d* through the notch 52*b* of the spacer 52 and the internal space of the spacer 52. Therefore, the expansion-side bypass port 53*a* and the contraction-side bypass port 53*b* are connected with the vertical hole 23*d*.

The expansion-side bypass valve 32 is stacked beneath the bypass valve disc 53 in FIG. 4. The expansion-side bypass valve 32 is seated on the valve seat 53*d* to block the lower end of the expansion-side bypass port 53*a* in FIG. 4. As the expansion-side bypass valve 32 is flexed by the pressure from the expansion-side chamber R4 side, the expansion-side bypass port 53*a* is opened. It is noted that the contraction-side bypass port 53*b* is designed not to be blocked by the expansion-side bypass valve 32.

The contraction-side bypass valve 33 is stacked on the bypass valve disc 53 in the upside in FIG. 4. The contraction-side bypass valve 33 is seated on the valve seat 53*c* to block the upper end of the contraction-side bypass port 53*b* in FIG. 4. As the contraction-side bypass valve 33 is flexed by the pressure from the chamber C side, the contraction-side bypass port 53b is opened. It is noted that the expansion-side bypass port 53a is designed not to be blocked by the contraction-side bypass valve 33.

In this manner, the expansion-side bypass valve 32 and the contraction-side bypass valve 33 are arranged over the piston 22 inside the expansion-side chamber R4. Therefore, it is possible to increase the outer diameter of the bypass valve disc 53 and accordingly increase the outer diameters of the expansion-side bypass valve 32 and the contraction-side bypass valve 33. As a result, it is possible to increase seat diameters of the expansion-side bypass valve 32 and the contraction-side bypass valve 33 seated on the valve seats 53c and 53d (maximum radius from the center to the valve seat abutting portion) and improve a degree of freedom for setting resistance generated in the flow of the liquid passing through the expansion-side bypass valve 32 and the contraction-side bypass valve 33.

It is noted that, if it is desired to provide a throttle in the shock absorber D1 in parallel with the expansion-side bypass valve 32 and the contraction-side bypass valve 33, the throttle may be formed by providing a notch in the valve seat 53c or 53d of the bypass valve disc 53 or by providing a notch in the outer circumference side of the expansion-side bypass valve 32 or the contraction-side bypass valve 33.

The housing 24 has a bottomed-cylindrical cap nut portion 36 screwed to the thread portion 23b of the piston rod 23, a nut portion 35 having a guard 37 provided in the outer circumference of the cap nut portion 36, and a bottomed-cylindrical outer tube 38 having an opening caulked and integrated to the outer circumference of the guard 37 of the nut portion 35. In addition, the nut portion 35 and the outer tube 38 define the compression chamber R6 inside the contraction-side chamber R5. It is noted that, in order to integrate the nut portion 35 and the outer tube 38, other methods such as welding may be employed instead of the caulking, and the nut portion 35 and the outer tube 38 may be integrated as a single component.

The free piston 29 is slidably inserted into the inside of the compression chamber R6. The compression chamber R6 is partitioned by the free piston 29 into the expansion-side compression chamber 27 in the upper side and the contraction-side compression chamber 28 in the lower side in FIG. 4.

The nut portion 35 is designed to fix the housing 24 to the small diameter portion 23a of the piston rod 23 by screwing the cap nut portion 36 to the thread portion 23b of the piston rod 23. At least a part of the outer circumference of the outer tube 38 may have a cross-sectional shape other than a perfect circle, such as a partially chamfered shape or a hexagonal shape. As a result, by using a tool engaged with the outer circumference, it is possible to facilitate a work for screwing the housing 24 to the piston rod 23.

The cap nut portion 36 is provided with a through-hole 36a opened from the lateral side to the inside. The expansion-side compression chamber 27 is connected with the vertical hole 23d of the piston rod 23 through the through-hole 36a. Therefore, the expansion-side compression chamber 27 is connected with the chamber C formed by the cap 51 and the bypass valve disc 53 and is also connected with the expansion-side chamber R4 through the expansion-side bypass port 53a and the contraction-side bypass port 53b. In this manner, the expansion-side flow passage 25 includes the through-hole 36a, the vertical hole 23d, the horizontal hole 23e, the internal space of the spacer 52, the notch 52b, the chamber C, the expansion-side bypass port 53a, and the contraction-side bypass port 53b. Therefore, it is considered that the expansion-side bypass valve 32 and the contraction-side bypass valve 33 are provided in parallel with the expansion-side flow passage 25.

The outer tube 38 has a bottomed cylindrical shape and is provided with the bottom portion 38a and the tubular portion 38b. The tubular portion 38b has a small diameter portion 38c having a small diameter in the bottom portion side, a large diameter portion 38d having a large diameter in the side opposite to the bottom portion, and a step portion 38e formed in a boundary between the small diameter portion 38c and the large diameter portion 38d. The bottom portion 38a has a contraction-side flow passage 26 for connecting the contraction-side chamber R5 with the internal space of the housing 24.

The free piston 29 has a bottomed cylindrical shape. The free piston bottom portion 29a of the free piston 29 is directed downward in FIG. 4 so that the bottom portion 29a is inserted into the housing 24 while the outer circumference of the free piston tubular portion 2913 makes sliding contact with the inner circumference of the large diameter portion 38d of the tubular portion 38b of the outer tube 38. In this manner, since the free piston 29 has a bottomed cylindrical shape, the free piston 29 can slide along the housing 24 without rattling, and the stroke length of the free piston 29 can be sufficiently obtained without interfering with the cap nut portion 36.

As the free piston 29 is slidably inserted into the housing 24, the inside of the compression chamber R6 is partitioned into the expansion-side compression chamber 27 and the contraction-side compression chamber 28.

The free piston 29 is provided with a spring member that exerts a biasing force for suppressing displacement thereof depending on a displacement amount of the free piston 29 with respect to the compression chamber R6. The spring member has a coil spring 42 interposed between the free piston bottom portion 29a and the guard 37 of the nut portion 35 and a coil spring 43 interposed between the bottom portion 38a of the outer tube 38 and the free piston bottom portion 29a inside the contraction-side compression chamber 28. The free piston 29 is nipped between the coil springs 42 and 43 and is elastically supported while being positioned in the neutral position inside the compression chamber R6.

A contraction-side stopper member 48 is interposed between the bottom portion 38a and the coil spring 43. The contraction-side stopper member 48 is a silk-hat-shaped member having a capped cylindrical stopper body 48a and a flange 48b provided in the outer circumference of the lower end of the tubular portion of the stopper body 48a. The contraction-side stopper member 48 has a through-hole 48c that is opened from the lateral side of the stopper body 48a and penetrates through the inside. The contraction-side compression chamber 28 is connected with the contraction-side chamber R5 through the contraction-side flow passage 26 and the through-hole 48c.

It is noted that other elastic members may be employed as the spring member instead of the coil springs 42 and 43 if it can elastically support the free piston 29. For example, an elastic body such as a disc spring may be employed to elastically support the free piston 29. In addition, when a single spring member having one end connected to the free piston 29 is employed, the other end may be fixed to the nut portion 35 or the outer tube 38.

An expansion-side cushion member 46 formed of rubber or resin is installed to the upper end of the free piston bottom portion 29a of the free piston 29 in FIG. 4. The expansion-side cushion member 46 has a pedestal installed to the free piston 29 and a narrowing head, so that its cross-sectional area is gradually reduced toward the tip. In addition, a contraction-side cushion member 47 formed of rubber or resin is installed to the lower end of the free piston bottom portion 29a of the free piston 29 in FIG. 4. Similar to the expansion-side cushion member 46, the contraction-side cushion member 47 has a pedestal installed to the free piston 29 and a narrowing head, so that its cross-sectional area is gradually reduced toward the tip.

The expansion-side cushion member 46 is provided to face the cap nut portion 36. As the free piston 29 is displaced from the neutral position to the vicinity of the stroke end upward in FIG. 4, the expansion-side cushion member 46 makes contact with the bottom portion of the cap nut portion 36. If the free piston 29 further moves upward, the expansion-side cushion member 46 is compressed to increase a repulsive force. As a result, an upward movement speed of the free piston 29 is reduced, and the free piston 29 finally stops at the expansion-side stroke end. Therefore, according to this embodiment, the cap nut portion 36 and the expansion-side cushion member 46 constitute the expansion-side elastic stopper 44 while the cap nut portion 36 is used as an expansion-side stopper member.

The contraction-side cushion member 47 is provided to face the contraction-side stopper member 48. As the free piston 29 is displaced from the neutral position to the vicinity of the stroke end downward in FIG. 4, the contraction-side cushion member 47 makes contact with the tip of the stopper body 48a of the contraction-side stopper member 48. As the free piston 29 further moves downward, the contraction-side cushion member 47 is compressed to increase a repulsive force. As a result, the downward movement speed of the free piston 29 is reduced, and the free piston 29 finally stops at the contraction-side stroke end. Therefore, according to this embodiment, the contraction-side cushion member 47 and the contraction-side stopper member 48 constitute the contraction-side elastic stopper 45.

The expansion-side cushion member 46 and the contraction-side cushion member 47 cause the free piston 29 to stop by gradually increasing the repulsive force as the compression of the free piston 29 advances. For this reason, the free piston 29 is slowly decelerated and stops, so that the damping force attenuation effect is smoothly dissipated, an abrupt change of the damping force is prohibited. Since the expansion-side cushion member 46 and the contraction-side cushion member 47 have a narrowing head shape, they make contact with the cap nut portion 36 and the contraction-side stopper member 48, respectively, serving as the expansion-side stopper member, starting from the tip. As a result, as the compression of the free piston 29 advances, a contact area between the expansion-side stopper member and the contraction-side stopper member 48 increases so that it is possible to gradually increase the repulsive force. Therefore, it is possible to easily set an increase rate of the repulsive force. It is noted that, if the heads of the expansion-side cushion member 46 and the contraction-side cushion member 47 have a narrowing head shape such as a ball shape, a conical shape such as circular conical shape and a tetragonal conical shape, a convex shape, and a stepped shape, it is possible to increase a contact area between the expansion-side stopper member and the contraction-side stopper member 48 as the compression of the free piston 29 advances. In order to increase the repulsive forces of the expansion-side cushion member 46 and the contraction-side cushion member 47 as the compression of the free piston 29 advances, the head may have other shapes such as a circular columnar shape or a circular cylindrical shape. In addition, other shapes may be employed instead of the narrowing head shape.

Alternatively, the free piston 29 may stop at the expansion-side stroke end by causing the expansion-side elastic stopper 44 to make contact with the upper end of the free piston tubular portion 29b serving as an elastic body stacked on the lower surface of the guard 37. The free piston may stop at the contraction-side stroke end by causing the contraction-side elastic stopper 45 to make contact with the outer circumference of the lower end of the free piston bottom portion 29a serving as an elastic body stacked on the upper surface of the step portion 38e of the outer tube 38. As the elastic body of the expansion-side elastic stopper 44 and the contraction-side elastic stopper 45 may be formed of rubber or resin, and an elastic body such as a spring may also be employed.

The shock absorber D1 configured as described above is operated similarly to the shock absorber D. Even when the vibration frequency input to the shock absorber D1, that is, a frequency of the expansion/contraction vibration of the shock absorber D1 is either a high frequency or a low frequency, the amplitude of the shock absorber D1 for a low-frequency vibration input is larger than the amplitude of the shock absorber D for a high-frequency vibration input under the same piston speed.

When a low-frequency vibration is input to the shock absorber D1, the amplitude is large. Therefore, the flow rate of the liquid accessing the expansion-side chamber R4 and the contraction-side chamber R5 in a single expansion/contraction cycle increases. In proportion to this flow rate, the displacement of the free piston 29 also increases. Since the free piston 29 is biased by the spring member including the coil springs 42 and 43, the biasing force of the free piston 29 received from the spring member also increases. As a result, a pressure difference is generated between the expansion-side compression chamber 27 and the contraction-side compression chamber 28. Therefore, the pressure difference between the expansion-side chamber R4 and the expansion-side compression chamber 27 and the pressure difference between the contraction-side chamber R5 and the contraction-side compression chamber 28 are reduced, so that the flow rate passing through the apparent flow passage described above is reduced. As the flow rate passing through the apparent flow passage is reduced, the flow rate passing through the expansion-side valve 31b or the contraction-side valve 31d increases. Therefore, the damping force generated by the shock absorber D1 is maintained at a high value.

In comparison, when a high-frequency vibration is input to the shock absorber D1, the amplitude is smaller than that of the low-frequency vibration input. Therefore, the flow rate of the liquid accessing the expansion-side chamber R4 and the contraction-side chamber R5 in a single expansion/contraction cycle is reduced. Therefore, the displacement of the free piston 29 is reduced. As the displacement of the free piston 29 is reduced, the biasing force of the free piston 29 received from the spring member is also reduced. As a result, the pressure of the expansion-side compression chamber 27 becomes nearly equal to the pressure of the contraction-side compression chamber 28. Therefore, the pressure difference between the expansion-side chamber R4 and the expansion-side compression chamber 27 and the pressure difference between the contraction-side chamber R5 and the contraction-side compression chamber 28 increase relatively to a low-frequency vibration input. Therefore, the flow rate passing through the apparent flow passage described above increases relatively to the low-frequency vibration input. As the flow rate passing through the apparent flow passage increases, the flow rate passing through the expansion-side valve 31b or the contraction-side valve 31d is reduced. Therefore, the damping force generated by the shock absorber D1 is reduced relatively to the low-frequency vibration input.

When the flow rate is large, the expansion-side bypass valve 32 and the contraction-side bypass valve 33 is less subject to a pressure loss relatively to an orifice or a variable-area orifice employed in shock absorbers of the prior art. Even when a high-frequency vibration is continuously input to the shock absorber D1, and the free piston 29 is deviated from the neutral position to the expansion-side compression chamber side or the contraction-side compression chamber side, a liquid pressure lock that suppresses movement of the free piston 29 is not generated. Therefore, the free piston 29 can smoothly move, and it is possible to sufficiently exhibit a damping force attenuation effect. When the free piston 29 reaches the stroke end, the expansion-side elastic stopper 44 or the contraction-side elastic stopper 45 decelerates and stops movement of the free piston 29. Therefore, without using a liquid pressure lock unlike the shock absorbers of the prior art, it is possible to slowly decelerate and stop the free piston 29 at the stroke end. As a result, it is possible to prevent an abrupt loss of the damping force attenuation effect and an abrupt change of the damping force caused by an abrupt stop of the free piston 29.

In this manner, in the shock absorber D1 according to this embodiment, it is possible to slowly decelerate and stop the free piston 29 at the stroke end by using the expansion-side elastic stopper 44 or the contraction-side elastic stopper 45. In addition, instead of the throttle such as an orifice serving as a liquid pressure lock, the expansion-side bypass valve 32 and the contraction-side bypass valve 33 less subject to a pressure loss are employed when the flow rate is high. Therefore, even when the free piston 29 is deviated from the neutral position, the movement of the free piston 29 is not locked until the stroke end.

Therefore, using the shock absorber D1 according to this embodiment, it is possible to exhibit a damping force attenuation effect even when a high-frequency vibration is continuously input, and the free piston 29 is deviated to the contraction-side compression chamber side.

Therefore, in the shock absorber D1 according to this embodiment, it is possible to exhibit a damping force attenuation effect even when a high-frequency vibration is continuously input. Therefore, even when a vehicle travels on an uneven or bumpy road, it is possible to implement an excellent ride quality.

Embodiments of this invention were described above, but the above embodiments are merely examples of applications of this invention, and the technical scope of this invention is not limited to the specific constitutions of the above embodiments.

This application claims priority based on Japanese Patent Application No. 2013-193977 filed with the Japan Patent Office on Sep. 19, 2013, the entire contents of which are incorporated into this specification.

The invention claimed is:

1. A shock absorber, comprising:
a cylinder;
a piston slidably inserted into the cylinder to partition the inside of the cylinder into an expansion-side chamber and a contraction-side chamber;
a piston rod movably inserted into the cylinder and provided with one end connected to the piston;
a damping passage that connects the expansion-side chamber with the contraction-side chamber;
a compression chamber;
a free piston movably inserted into the compression chamber to partition the compression chamber into an expansion-side compression chamber and a contraction-side compression chamber;
a spring member configured to generate a biasing force for suppressing displacement of the free piston with respect to the compression chamber;
an expansion-side flow passage that connects the expansion-side chamber with the expansion-side compression chamber;
a contraction-side flow passage that connects the contraction-side chamber with the contraction-side compression chamber;
an expansion-side bypass valve arranged closer to the expansion-side chamber side relative to the piston and provided in the expansion-side flow passage, the expansion-side bypass valve being configured to admit only a flow directed from the expansion-side chamber to the expansion-side compression chamber and generate resistance;
a contraction-side bypass valve arranged closer to the expansion-side chamber side relative to the piston and provided in the expansion-side flow passage in parallel with the expansion-side bypass valve, the contraction-side bypass valve being configured to admit only a flow directed from the expansion-side compression chamber to the expansion-side chamber and generate resistance;
an expansion-side elastic stopper configured to stop the free piston at an expansion-side stroke end;
a contraction-side elastic stopper configured to stop the free piston at a contraction-side stroke end, and
a bypass valve disc mounted closer to the expansion-side chamber side of the piston rod relative to the piston and included in a part of an expansion-side passage connected to the expansion-side chamber,
wherein the expansion-side bypass valve and the contraction-side bypass valve are mounted to the bypass valve disc.

2. The shock absorber according to claim 1, wherein the bypass valve disc has a contraction-side bypass port and an expansion-side bypass port connected to the expansion-side chamber,
the piston rod has an internal passage that connects the expansion-side compression chamber to the expansion-side bypass port and the contraction-side bypass port,
the expansion-side bypass port, the contraction-side bypass port, and the internal passage constitute the expansion-side flow passage,
the expansion-side bypass valve is operated to open or close the expansion-side bypass port, and
the contraction-side bypass valve is operated to open or close the contraction-side bypass port.

3. The shock absorber according to claim 1, wherein both the expansion-side bypass valve and the contraction-side bypass valve are formed by using a leaf valve.

4. The shock absorber according to claim 1, wherein the expansion-side bypass valve and the contraction-side bypass valve are formed by using a single annular leaf valve for opening or closing the expansion-side flow passage by flexing an inner circumference side or an outer circumference side.

5. The shock absorber according to claim 1, further comprising a housing that forms the compression chamber, wherein the expansion-side elastic stopper has an expansion-side cushion member provided in one of the free piston and the housing, and an expansion-side stopper member provided in the other one of the free piston and the housing to face the expansion-side cushion member, and the contraction-side elastic stopper has a contraction-side cushion member provided in one of the free piston and the housing, and a contraction-side stopper member provided in the other one of the free piston and the housing to face the contraction-side cushion member.

6. The shock absorber according to claim 5, wherein the expansion-side cushion member and the contraction-side cushion member have a narrowing head shape.

* * * * *